United States Patent [19]
Beelow

[11] 4,114,772
[45] Sep. 19, 1978

[54] PONTOON BOAT TRAILER

[76] Inventor: Ralph E. Beelow, 4243 - 13th Ave. South, Minneapolis, Minn. 55404

[21] Appl. No.: 824,538

[22] Filed: Aug. 15, 1977

[51] Int. Cl.² .............................................. B60P 3/10
[52] U.S. Cl. ...................................... 214/512; 9/1.2;
214/84; 280/414 R
[58] Field of Search ....................... 214/84, 512; 9/1.2;
280/414 R, 414 B; 254/11 R, 11 B

[56] References Cited
U.S. PATENT DOCUMENTS

| 3,552,556 | 1/1971 | Hall | 214/512 |
| 3,802,006 | 4/1974 | Nelson | 214/512 X |

Primary Examiner—Robert G. Sheridan
Attorney, Agent, or Firm—Donald A. Jacobson

[57] ABSTRACT

A trailer for loading, transporting and launching pontoon boats. A movable framework on the trailer bed is provided which can be lowered for loading the boat on land, elevated for transporting, and again lowered for launching a pontoon boat.

3 Claims, 3 Drawing Figures

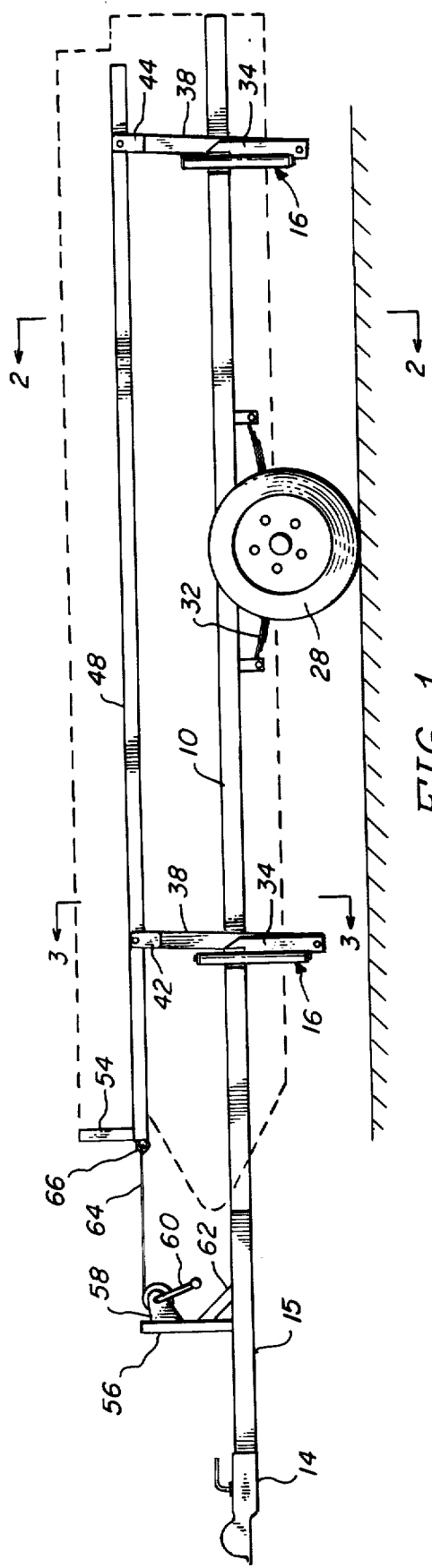
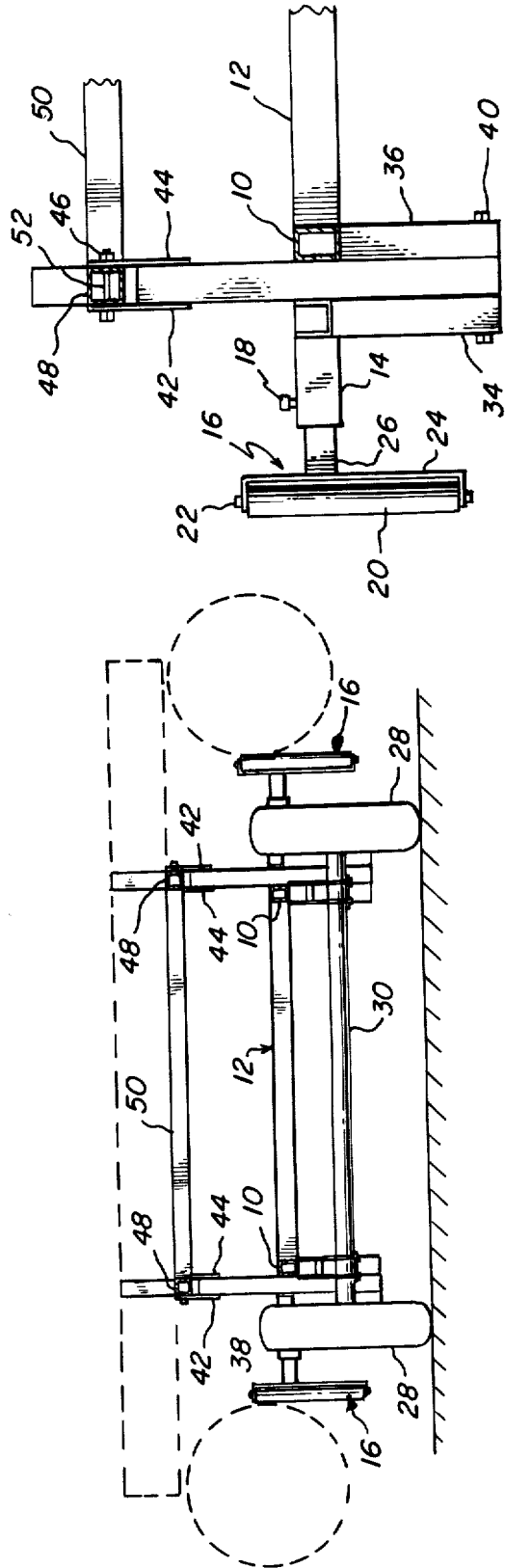

PONTOON BOAT TRAILER

BRIEF DESCRIPTION OF THE INVENTION

A number of trailers have been developed for the transporting of conventional boats from one body of water to another. In removing a boat from the water, the trailer is generally backed down a shallow ramp into the water until the boat supporting members, in the form of a cradle, are immersed and the boat is guided over these supporting members by means of rollers and a winch. The boat is then secured in place and the trailer towed onto dry land, carrying the boat along with it. To launch a conventional boat, the process is simply reversed.

A pontoon boat, because of its unusual shape, cannot be transported in this manner. The use of supporting members to enclose a pontoon boat would result in a trailer which would be too wide to be towed on a highway. The flotation pontoon, being positioned at the lower extremity of the boat, present a clearance problem in transportation which can be accommodated by a conventional boat trailer.

SUMMARY OF THE INVENTION

The principle object of the present invention is to provide a trailer, specifically for pontoon boats, which will facilitate the launching and retrieving of such boats.

Another object is to provide a trailer for pontoon boats which will fit within the pontoon members to thereby limit the width to a size allowing highway travel.

Another object is to provide a ready means for elevating a pontoon boat for transport to provide suitable highway clearance.

Still other objects are to provide a pontoon boat trailer to which a pontoon boat can be attached while afloat, that will lift the pontoon boat from the water for ease in removal and to provide clearance while transporting the boat on the highway, and that can be used to hold the boat in an elevated position as the trailer is backed into the water for ease in launching.

In accordance with the teachings of the present invention, a trailer bed is provided consisting of a rigid, rectangular framework, having two automobile type wheels connected by an axle with the wheels and axle attached to the trailer bed using conventional automobile type leaf springs. A tongue is attached to the front end of the trailer bed with a triangular framework. The transverse cross-pieces making up the width dimension of the trailer bed are extended slightly beyond the longitudinal frame members and terminate in vertical guides. Rollers on the outer surface of these vertical guides are designed to abut the inside surface of the pontoon and provide a low friction guide for the boat as it is unloaded or loaded.

A generally rectangular shaped framework is pivotably attached to the trailer bed by a plurality of arms attached to vertically extending brackets which project downward from the trailer bed in the neighborhood of the cross-pieces. This rectangular framework can be positioned to ride on the trailer bed or it can be rotated upward and forward with the pivot arms providing the degree of freedom and range of vertical movement. The extensions of the cross-pieces, to which the rollers are attached, act as stops and prevent the pivot arms from attaining a perpendicular attitude. The movable frame has two vertical projections at its front corners which act as boat stops. A vertical braced projection on the tongue holds a conventional boat winch. This winch is used to tighten a cable to lift the movable framework upward and forward, or, when slacked off, to lower the framework to the trailer bed. The fact that the four arms are prevented from reaching a vertical attitude insures that the movable framework will lower, under gravity forces, when the cable is slackened.

Additional objects and features of the invention will become apparent from the following detailed description and drawings, and discloses what is presently contemplated as the best mode of invention.

BRIEF DESCRIPTION OF THE DRAWINGS

FIG. 1 is a side view of the trailer with the movable platform shown in its elevated position for towing, the pontoon boat being represented in phantom lines;

FIG. 2 is a vertical section on the line 2—2, with the movable platform in its elevated position, the pontoon boat again being shown in phantom lines; and FIG. 3 is a fragmentary vertical section on the line 3—3 showing the detail of a platform pivot arm and attachments.

DETAILED DESCRIPTION OF THE PREFERRED EMBODIMENT

Referring first to FIG. 1, there is shown a side elevation of the preferred embodiment. While only the left side is illustrated, it is to be understood that the trailer unit is generally symmetrical so that its shape can be easily visualized. The trailer bed is formed from channel iron and includes a longitudinal member 10 and a plurality of transverse members 12 as illustrated in the cross-sectional view of FIG. 2. The number of transverse members extending between the longitudinal side members 10 is determined by the weight and strength of the bed. The transverse member may be welded to or otherwise affixed by suitable bolts and brackets to form a generally rectangular frame.

Located at the front end of the trailer bed is a conventional trailer hitch 14 which is secured to the frame 10 by a channel member 15 which is connected at an angle with respect to the side members 10 to form a triangle with the hitch 14 being located at the apex of this triangle. The trianglar end of the trailer bed thus forms the trailer tongue.

As may best be seen in the fragmentary cross-sectional view of FIG. 3, the cross members 12 have a portion 14 which extends beyond the edge of the side channels 10. A roller assembly, indicated generally by numeral 16, is secured to the extensions 14 by means of a bolt 18. The roller itself comprises a cylindrical member 20 mounted on an axle 22 which is secured by a bracket 24 to a rectangular channel member 26. The channel 26 is so dimensioned so as to be telescopically insertable within the channel extension 14. The set screw 18 may be used to hold the roller assembly 16 a desired lateral distance from the side of the trailer bed 10.

Located approximately midway along the length of the trailer bed are a pair of wheels 28 which are mounted on an axle 30 in a conventional fashion. The wheel and axle assembly is secured to the side members 10 of the trailer bed by means of leaf-type springs 32. It is preferable that the axle of the trailer be located at the approximate center of balance of the trailer assembly so that the trailer may be tipped about this axle.

Welded or otherwise secured to the sides 10 of the trailer bed are downwardly extending brackets 34 and 36 (FIG. 3) which too may be formed from pieces of channel iron. Sandwiched between the brackets 34 and 36 is a linkage 38 of a predetermined length determined generally by the circumference of the pontoons on the boat to be transported. The linkages 38 are pivotally secured by means of a pin 40 which passes through the brackets 34, 38 and 36 so that the linkage 38 is free to rotate about this pin.

Welded near the upper end of the linkage 38 are side plates 42 and 44 having an aperture 46 passing therethrough. Passing between the extensions of the side plates 42 and 44 beyond the end of the linkage 38 is a channel member 48 which forms the side of a rectangular framework having transversely extending crosspieces at spaced intervals along the length of the upper framework. Pins 52 pass through the side plates 42 and 44 and through the side channels 48 such that the side channels are free to rotate about the pins 52 as axes.

It should be noted that the extensions 14 of the crossmembers 12 are oriented with respect to the ends of the brackets 34 and 36 so that when the rectangular frame member is rotated to its most forward position, the linkages 38 are at an acute angle with respect to the horizontal. That is, the extensions 14 prevent the linkages 38 from assuming a perfectly vertical orientation.

Located at each corner of the upper framework are vertically extending stop members 54. These stop members are designed to engage the front deck portion of the pontoon boat to thereby arrest further forward positioning of the boat with respect to the rotatable frame on the trailer bed.

Located on a cross-member (not shown) on the tongue portion 16 of the trailer bed is an upwardly projecting mounting plate 56 to which is secured a winch 58 having a crank 60. A brace 62 may be used to relieve any strain on the mounting plate 56 when the winch is operated. A cable 64 on the winch 58 is connected to a U-bolt 66 on the front cross-member 50 of the movable frame.

Now that the details of the construction of the preferred embodiment have been described in detail, consideration will be given to the manner in which the invention may be utilized to facilitate the loading, unloading and transportation of a pontoon boat.

OPERATION

As is shown in the cross-sectional view of FIG. 2, especially by the phantom lines, the pontoon boat generally includes a flat horizontal platform having flotation tanks or pontoons secured to the underside thereof and at the outer edges of the platform. Assuming that the pontoon boat is resting on dry land and it is desired to elevate the boat onto the trailer for transportation, the owner first unwinds the cable from the winch. Because, as mentioned, the vertical linkage members 38 are at an acute angle with respect to the horizontal, the force of gravity will cause the linkages to rotate in a clockwise direction and thereby lower the movable frame member including the side channels 48 and the cross channels 50 to rest upon the trailer bed. When in this position, the height dimension of the trailer unit is less than the distance between the lower surface of the pontoon boat deck and the ground. As such, the trailer may be positioned beneath the pontoon boat with the outwardly extending vertical rollers 16 providing a guide for proper positioning thereof. The vertical corner projections 54 act aas a stop when they are made to abut the front edge of the deck of the pontoon boat.

Next, the operator turns the crank 60 to wind the cable back onto the winch and in doing so applies a forward force upon the movable framework. This force is coupled through the linkage members 38, causing the movable framework to be elevated as it is urged forward. This lifts the pontoons off of the ground, thus allowing the trailer to be towed behind a vehicle.

When it is desired to launch the pontoon boat into water, the driver will back the trailer with the boat on it down a ramp and into the water to a level where the bottom of the pontoons are partially submerged. He will then unwind the cable from the winch and, again, because of the acute angle at which the linkage members 38 are mounted with respect to the horizontal, the force of gravity will cause the movable frame member abutting the deck of the pontoon boat to drop down against the trailer bed. In doing so, a point is reached where the pontoon boat is floating, and the driver may now pull the trailer up the launching ramp, leaving the pontoon boat in the water.

While a preferred embodiment of the pontoon boat trailer has been described, it is to be understood that various modifications may be made thereto. The following claims are, therefore, intended to cover any such modifications within the true spirit and scope of the invention.

What is claimed is:

1. A trailer especially suited for transporting and launching pontoon type boats of the type including a generally planar, rectangular, deck surface with first and second elongated floatation members affixed to the underside of said deck proximate opposed side edges thereof, comprising:
   (a) a trailer bed mounted on wheels, the width of said bed being less than the spacing between said floatation members;
   (b) a plurality of linkage members pivotally coupled at one end thereof to said trailer bed at spaced apart locations along the length and at either side thereof;
   (c) a movable frame member having opposed sides thereof pivotally secured to the other ends of said plurality of linkage members, the opposed sides of said frame being spaced apart by a distance which is less than the spacing between said floatation members on the pontoon boat to be transported; and
   (d) A plurality of roller assemblies affixed to the sides of said trailer bed and adjustably extendable outwardly therefrom for abutting the floatation members on a pontoon boat being transported to prevent lateral movement of said boat with respect to said trailer bed, the arrangement being such that when a longitudinal force is applied to said movable frame member, said frame member is translated in a vertical direction.

2. Apparatus as in claim 1 and further including a winch mounted on said trailer bed at the front end thereof and having a cable secured to said movable frame member at its forward end for applying said longitudinal force to said movable frame member.

3. Apparatus as in claim 1 and further including stop means extending outward from the sides of said trailer bed in the path of said plurality of linkage members to confine the rotation thereof to angles of less than ninety degrees with respect to the horizontal.

* * * * *